US011092688B1

(12) United States Patent
Wang et al.

(10) Patent No.: US 11,092,688 B1
(45) Date of Patent: Aug. 17, 2021

(54) SPATIAL AND TEMPORAL PROCESSING OF ULTRASONIC SENSOR DETECTIONS FOR MAPPING IN VEHICLE-PARKING-ASSIST FUNCTIONS

(71) Applicant: Aptiv Technologies Limited, St. Michael (BB)

(72) Inventors: Qian Wang, Westfield, IN (US); Kevin J. Hawes, Greentown, IN (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 16/825,206

(22) Filed: Mar. 20, 2020

(51) Int. Cl.
*B60Q 1/00* (2006.01)
*G01S 15/931* (2020.01)
*G01S 7/52* (2006.01)
*G01S 15/89* (2006.01)

(52) U.S. Cl.
CPC ........ *G01S 15/931* (2013.01); *G01S 7/52003* (2013.01); *G01S 15/89* (2013.01); *G01S 2015/932* (2013.01)

(58) Field of Classification Search
CPC .... G01S 15/931; G01S 7/52003; G01S 15/89; G01S 2015/932
USPC ........................................................ 340/435
See application file for complete search history.

(56) References Cited

U.S. PATENT DOCUMENTS

| 4,931,930 A | 6/1990 | Shyu et al. |
| 6,999,003 B2 | 2/2006 | Matsukawa et al. |
| 7,660,205 B2 | 2/2010 | Barth et al. |
| 8,319,663 B2 | 11/2012 | Von Reyher et al. |
| 9,318,022 B2 | 4/2016 | Barth |
| 9,514,646 B2 | 12/2016 | Stefan et al. |
| 10,179,584 B2 | 1/2019 | Greene et al. |
| 2015/0138011 A1 | 5/2015 | Hiramaki et al. |
| 2019/0217856 A1* | 7/2019 | Inoue ................. B60W 30/06 |

(Continued)

FOREIGN PATENT DOCUMENTS

| JP | 2006007875 | 1/2006 |
| WO | 2014013861 | 1/2014 |

OTHER PUBLICATIONS

Proceedings of the 2004 IEEE International Conference on Robotics & Automation, New Orleans, LA, Apr. 2004, Arc Carving: Obtaining Accurate, Low Latency Maps from Ultrasonic Range Sensors, David Silver et al.

(Continued)

*Primary Examiner* — Tanmay K Shah
(74) *Attorney, Agent, or Firm* — Colby Nipper PLLC

(57) ABSTRACT

This document describes spatial and temporal processing of ultrasonic-sensor detections for mapping in vehicle-parking-assist functions. Specifically, spatial intersections, which are determined from a pair of neighboring ultrasonic sensors having ultrasonic detections at substantially the same time, can address latency issues associated with temporal intersections and can be determined without the vehicle moving. Temporal intersections can address situations when one sensor of the pair of neighboring ultrasonic sensors has an ultrasonic detection while the other sensor does not. Using both the spatial and temporal intersections provides high accuracy for angular information, which enables enhanced mapping and efficient performance of vehicle-parking-assist functions.

20 Claims, 11 Drawing Sheets

(56) References Cited

U.S. PATENT DOCUMENTS

2020/0082248 A1\* 3/2020 Villegas ............... G05D 1/0223
2020/0223429 A1\* 7/2020 Marsousi ............. G05D 1/0255

OTHER PUBLICATIONS

IEEE Transactions on Robotics and Automation, vol. 19, No. 3, Jun. 2003, pp. 513-522, The Arc-Transversal Median Algorithm: A Geometric Approach to Increasing Ultrasonic Sensor Azimuth Accuracy, Choset et al.

\* cited by examiner

SPATIAL AND TEMPORAL PROCESSING OF ULTRASONIC SENSOR DETECTIONS FOR MAPPING IN VEHICLE-PARKING-ASSIST FUNCTIONS

BACKGROUND

Ultrasonic sensors have been widely used for lateral object detection and mapping in vehicle-parking-assist functions. Generally, ultrasonic sensors provide range-only detections. For each ultrasonic detection, an arc can be drawn into a two-dimensional overhead map based on the field of view (FOV) of the sensor, mounting position of the sensor, and localization information of the vehicle upon which the sensor is mounted. Some conventional methods that use such arc-based ultrasonic information for detection of an open parking space rely on the range detections but angular position/azimuth information of the detections remains unknown. Other conventional methods use a "centerline method" for mapping lateral objects, which assumes that the point of detection is at the center of the ultrasonic arc. These conventional methods suffer with poor accuracy in azimuth information, which can degrade the accuracy and efficiency of the vehicle-parking-assist functions.

Another conventional method fuses the current and previous ultrasonic detections and uses their intersection points to determine the azimuth. Although this fusion method provides a better azimuth accuracy than the centerline method, it suffers with a latency issue. Moreover, this fusion method requires the vehicle to be moving at a certain range of speed in order to generate the intersection points. For example, zero or very-low movement speed causes overlapping ultrasonic arcs, while high-speed movement causes separation of arcs and results in no intersections. Accordingly, accuracy of these conventional methods is limited and can result in poor performance of the vehicle-parking-assist functions.

SUMMARY

This document describes spatial and temporal processing of ultrasonic-sensor detections for mapping in vehicle-parking-assist functions. Specifically, spatial intersections, which are determined from a pair of neighboring ultrasonic sensors having ultrasonic detections at substantially the same time, can address latency issues associated with temporal intersections and can be determined without the vehicle moving. Temporal intersections can address situations when one sensor of the pair of neighboring ultrasonic sensors has an ultrasonic detection while the other sensor does not. Using both the spatial and temporal intersections provides high accuracy for angular information, which enables enhanced mapping and efficient performance of vehicle-parking-assist functions.

In other aspects, an object-detection system is described. The object-detection system includes a device for executing instructions stored in a memory to implement a fusion module. The fusion module is configured to identify, using object-detection data from a pair of neighboring ultrasonic sensors on a vehicle, spatial intersections between arcs of each sensor of the pair of neighboring ultrasonic sensors that are generated at approximately a same time. The fusion module can also identify temporal intersections in the object-detection data between a current arc and a previous arc of at least one sensor of the pair of neighboring ultrasonic sensors based on a movement speed of the vehicle. In addition, the fusion module can determine first range and angular information corresponding to an object relative to the vehicle based on the spatial intersections. The fusion module can also determine second range and angular information corresponding to the object relative to the vehicle based on the temporal intersections. The fusion module can generate a spatial-temporal fusion map that maps detections, by the pair of neighboring ultrasonic sensors, relative to the vehicle based on the first range and angular information and the second range and angular information.

In yet other aspects, a method for assisted parking of a vehicle is disclosed. The method includes detecting spatial intersection points between arcs of a pair of neighboring ultrasonic sensors that are lateral-side-mounted on a vehicle to detect one or more objects. Temporal intersection points are also detected between a current arc and a previous arc of at least one sensor of the pair of neighboring ultrasonic sensors. The temporal intersections are based on a movement speed of the vehicle. In addition, first range and angular information of the one or more objects relative to the vehicle is determined based on the spatial intersection points. Second range and angular information of the one or more objects relative to the vehicle is also determined based on the temporal intersection points. Using a combination of the first and second range and angular information enables detection of an open parking space on a lateral side of the vehicle and performance of a dynamic parking-assist maneuver of the vehicle into the open parking space.

In aspects, a method for spatial and temporal processing of ultrasonic-sensor detections for mapping in vehicle-parking-assist functions is described. The method includes detecting, by a first sensor, an object within a detection range. The method also includes determining whether a second sensor, which neighbors the first sensor, has also detected the object. Then, a detection-sensitivity threshold is adjusted for temporal processing based on whether the second sensor has also detected the object.

This summary is provided to introduce simplified concepts for spatial and temporal processing of ultrasonic-sensor detections for mapping in vehicle-parking-assist functions, which are further described below in the Detailed Description and Drawings. For ease of description, the disclosure focuses on automotive ultrasonic systems; however, the techniques are not limited to automobiles. The techniques also apply to ultrasonic sensors of other types of vehicles, systems, and moving platforms. The techniques described herein can also apply to other types of sensors, such as radar or infrared sensors. This summary is not intended to identify essential features of the claimed subject matter, nor is it intended for use in determining the scope of the claimed subject matter.

BRIEF DESCRIPTION OF THE DRAWINGS

The details of one or more aspects of spatial and temporal processing of ultrasonic-sensor detections for mapping in vehicle-parking-assist functions are described in this document with reference to the following drawings. The same numbers are used throughout the drawings to reference like features and components:

FIG. 2-1 illustrates an example implementation of the vehicle from FIG. 1 in more detail.

FIG. 2-2 illustrates an example implementation of the fusion module from FIG. 2-1 in more detail.

FIGS. 9-1 to 9-3 illustrate example implementations of size measurements determined during a dynamic parking-assist maneuver based on information from spatial and temporal processing of ultrasonic-sensor detections.

DETAILED DESCRIPTION

The details of one or more aspects of spatial and temporal processing of ultrasonic-sensor detections for mapping in vehicle-parking-assist functions are described below. Advanced driver-assistance systems, highly-automated driving systems, as well as other subsystems, demand accurate knowledge of the surrounding environment of the vehicle. Automotive ultrasonic sensors, which provide direct estimates of range, velocity, and angle information, have quickly become one of the vital sensing technologies of which these automotive subsystems rely for acquiring critical information of the environment.

To achieve high accuracy of range and angular detection and improve robustness of ultrasonic sensor perception over that of conventional systems, which assume the angle of detection aligns with a direction that the sensor faces or use temporal processing to find the angle of detection, a fusion of spatial and temporal processing can be implemented. In particular, a pair of neighboring sensors positioned on a lateral side and near each corner of a vehicle are used for detecting an object near the lateral side of the vehicle, such as a curb, a traffic cone, another vehicle, and so on. When both neighboring sensors detect an object, the intersection between their arcs is used to determine angular information of the object relative to the vehicle. These spatial intersections are fused with temporal intersections for increased detection accuracy, where the temporal intersections are based on two separate pulses of an individual sensor. When only one of the neighboring sensors detects the object, no spatial intersection can be determined due to insufficient datapoints but the temporal intersection between two pulses of the detecting sensor can be used to determine the angular information. By using different methods (e.g., temporal processing, spatial processing, or a combination of both temporal and spatial) in different scenarios for determining angular information, the techniques described herein provide high accuracy for angular information, including azimuth and elevation information.

This spatial and temporal processing can be used to improve ultrasonic-based mapping, localization, and path planning for various driver-assistance systems. Further, level 2 parking assist (e.g., partial automation) and level 4 automated parking valet (e.g., autonomous parking) using ultrasonic sensors is also greatly improved by the spatial and temporal processing.

Example Environment

Figure 1:
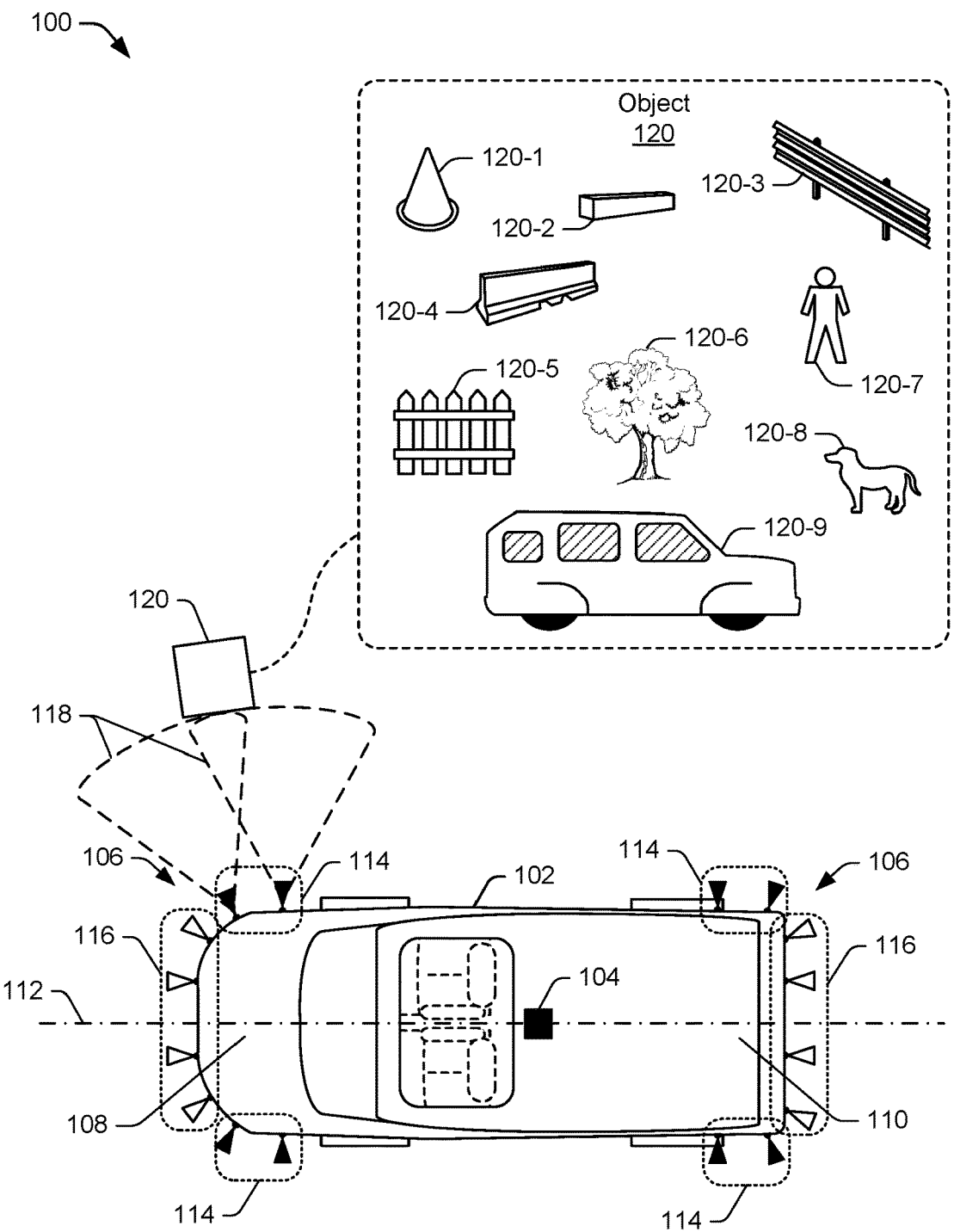
FIG. 1 illustrates an example environment in which one or more aspects of spatial and temporal processing of ultrasonic-sensor detections for mapping in vehicle-parking-assist functions can be implemented.

FIG. 1 illustrates an example environment 100 in which one or more aspects of spatial and temporal processing of ultrasonic-sensor detections for mapping in vehicle-parking-assist functions can be implemented. In the illustrated example, a vehicle 102 includes an object-detection system 104. The object-detection system 104 is communicatively coupled to a sensor layout 106 around a front 108 and rear 110 of the vehicle 102. On each lateral side of the vehicle 102 (e.g., side running substantially parallel to a longitudinal axis 112 of the vehicle 102) and proximate to each corner of the vehicle 102, are positioned at least one pair of neighboring ultrasonic sensors 114, which are usable for lateral object detection and mapping using spatial and temporal intersection points. Across the front 108 and the rear 110 of the vehicle 102 are optional ultrasonic sensors 116 that can be used for front/rear object detection and collision avoidance. The ultrasonic sensors 114 each have a field of view (FOV) 118 that encompasses a region of interest in which an object 120 can be detected. The FOV 118 of each sensor 114 in the pair of neighboring sensors partially overlaps with one another, to enable determination of an intersection point between arcs of ultrasonic pulses of the sensors 114. The neighboring sensors 114 may be separated horizontally by any suitable distance, such as a distance within a range of approximately 20-30 cm.

The object 120 comprises one or more materials that reflect ultrasonic signals. Depending on the application, the object 120 can represent a target of interest or clutter. The object 120 may be any object within the FOV of the sensors 114. Some example objects include a traffic cone 120-1 or other small object, a curb 120-2, a guard rail 120-3, a concrete barrier 120-4, a fence 120-5, a tree 120-6, a human 120-7, an animal 120-8 (e.g., dog, cat, rodent, and so forth, or another vehicle 120-9.

Figures 1, 2:
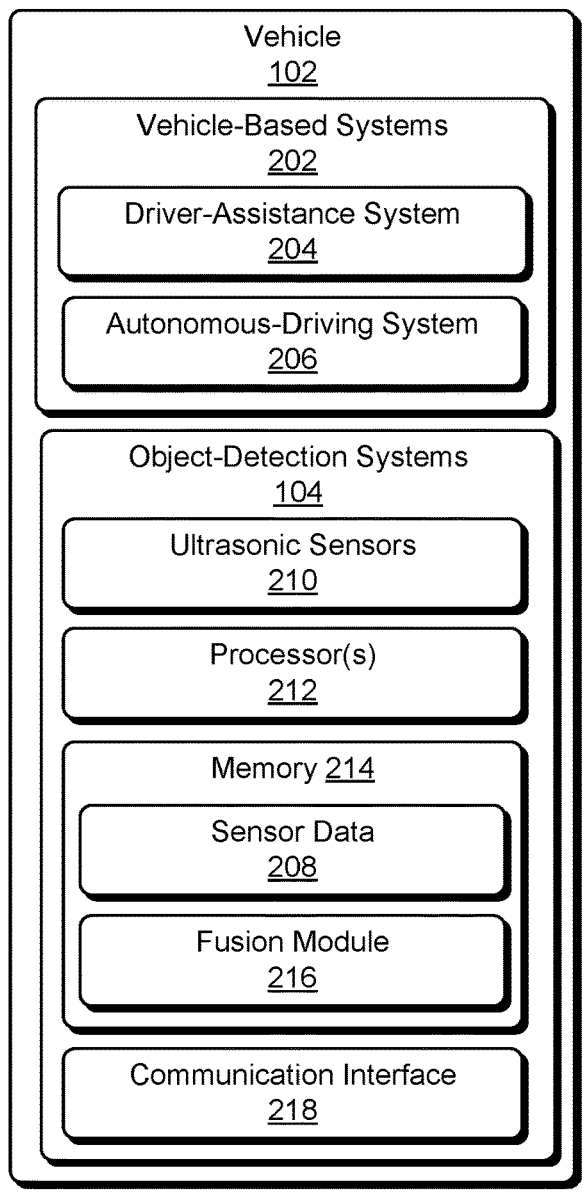
Figure 2:
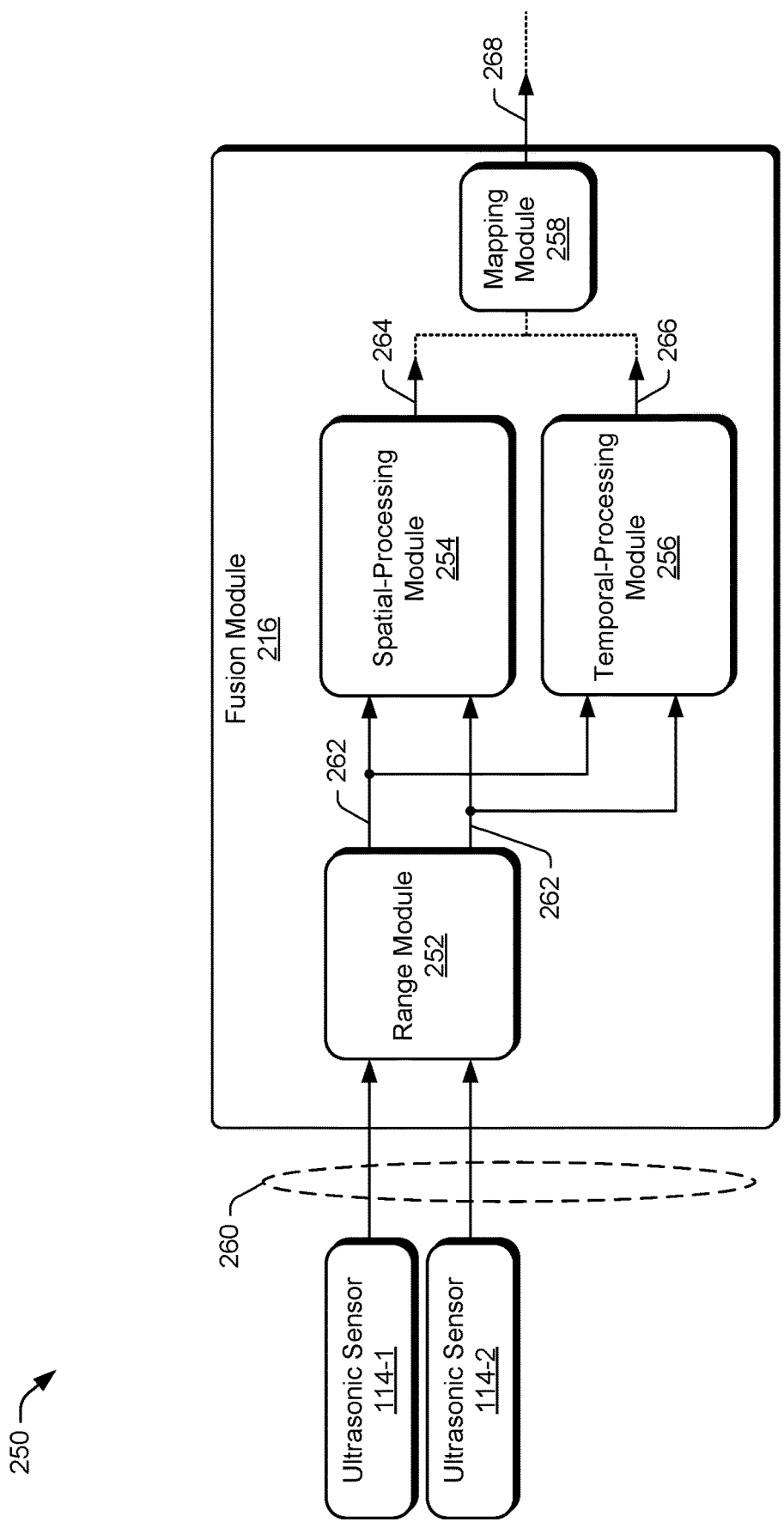

FIG. 2-1 illustrates an example implementation 200 of the vehicle 102 in more detail. The vehicle 102 includes vehicle-based systems 202 that rely on data from the object-detection system 104, such as a driver-assistance system 204 and/or an autonomous-driving system 206. One or both of the driver-assistance system 204 and the autonomous-driving system 206 may implement ultrasonic-based mapping, localization, and path planning, such as for vehicle-parking-assist functions.

Generally, the vehicle-based systems 202 use sensor data 208 provided by ultrasonic sensors 210 (e.g., ultrasonic sensors 114, 116) to perform a function. For example, the driver-assistance system 204 provides blind-spot monitoring and generates an alert that indicates a potential collision with an object that is detected by the ultrasonic sensors 210. In this case, the sensor data 208 from the ultrasonic sensors 210 indicates when an open parking spot is detected. In another case, the sensor data 208 from the ultrasonic sensors 210 indicates nearby objects, such as one or more parked vehicles, when the driver-assistance system 204 or the autonomous-driving system 206 is performing parking assist.

The vehicle 102 includes one or more processors 212 and a memory 214. The memory 214 can store the sensor data 208 obtained by the ultrasonic sensors 210. The memory 214 can also include a fusion module 216. Any suitable memory 214 can be used, such as a computer-readable storage media or other memory bank. The fusion module 216 can be implemented using hardware, software, firmware, or a combination thereof. In this example, the processor 212 executes instructions for implementing the fusion module 216. The fusion module 216 enables the processor 212 to process signals from the ultrasonic sensors 210 to detect an object and generate the sensor data 208 for the vehicle-based systems 202.

The fusion module 216 transforms raw data provided by the ultrasonic sensors 210 into usable data. The fusion module 216 analyzes the sensor data 208 to map one or more detections. The fusion module 216 determines whether to adjust the detection sensitivity of the ultrasonic sensors 210 based on the processing of the data for detections. One example includes decreasing the sensitivity by increasing a data-processing threshold to reduce noise. Another example includes increasing the sensitivity by decreasing the data-processing threshold to retain more details associated with the detection. The fusion module 216 also analyzes the sensor data 208 to determine spatial intersections and temporal intersections between arcs of the neighboring sensors 114 and, based on the spatial and temporal intersections, determines azimuth information corresponding to the detected object 120 relative to the vehicle 102.

The object-detection system 104 includes a communication interface 218 to transmit the sensor data to the vehicle-based systems 202 or to another component of the vehicle 102 over a communication bus of the vehicle 102, for example, when the individual components shown in the object-detection system 104 are integrated within the vehicle 102. In general, the sensor data provided by the communication interface 218 is in a format usable by the vehicle-based systems 202. In some implementations, the communication interface 218 may provide information to the object-detection system 104, such as the speed of the vehicle 102 or location information (e.g., geolocation). The object-detection system 104 can use this information to appropriately configure itself. For example, the object-detection system 104 can determine a temporal intersection between a current pulse and a previous pulse of a sensor 114 based on the speed of the vehicle, or a distance between a position of the sensor 114 at the time of each pulse. Further detail of temporal processing is provided below with respect to FIG. 3.

The ultrasonic sensors 210 can be any suitable sensor, including ultrasonic sensors or other sensors (e.g., radar, infrared) that provide range information to an object. Ultrasonic sensors, for example, can be used to determine range information of an object relative to the vehicle 102. The sensors 114, 116 may have a field of view of approximately 120°×60°. In aspects, the sensors 114, 116 may have a detection range from approximately 0.1 meters to approximately 2.5 meters with a resolution output of approximately 0.01 meters. The ultrasonic sensors 210 can also be independently controlled to use a suitable coding scheme (e.g., modulation) for simultaneous operation.

FIG. 2-2 illustrates an example implementation 250 of the fusion module 216 from FIG. 2-1. The fusion module 216 is illustrated as including a range module 252, a spatial-processing module 254, a temporal-processing module 256, and a mapping module 258. When a pair of neighboring ultrasonic sensors, such as a first ultrasonic sensor 114-1 and a second ultrasonic sensor 114-2 sense a detection, ultrasonic information 260 is transmitted to the range module 252. The range module 252 determines range information 262 corresponding to each detection for each ultrasonic sensor. The range module 252 sends the range information 262 of each ultrasonic sensor 114-1, 114-2 to the spatial-processing module 254 and the temporal-processing module 256.

The spatial-processing module 254 uses the range information 262 of both of the ultrasonic sensors 114-1, 114-2 to determine a spatial intersection between arcs of the ultrasonic sensors 114-1, 114-2, as is further described below with respect to FIG. 3. Using the spatial intersection, along with known information corresponding to each of the ultrasonic sensors 114-1, 114-2 (e.g., FOV of the sensor, mounting position of the sensor), the spatial-processing module 254 determines angular information of the detection. Then, the spatial-processing module 254 outputs spatially-determined angular information 264, along with the range information 262, corresponding to the detection.

The temporal-processing module 256 uses the range information 262 of either of the ultrasonic sensors 114-1, 114-2 in combination with a previous detection to determine a temporal intersection between an arc of a current detection by one of the ultrasonic sensors 114-1, 114-2 and an arc of a previous detection by one of the ultrasonic sensors 114-1, 114-2. This temporal processing by the temporal-processing module 256 is described in further detail below with respect to FIG. 4. The arcs of the current detection and the previous detection may correspond to the ultrasonic sensor 114-1 or the ultrasonic sensor 114-2. In one implementation, the arc of the current detection may correspond to the ultrasonic sensor 114-1 and the arc of the previous detection may correspond to the ultrasonic sensor 114-2, or vice-versa. The temporal-processing module 256 outputs temporally-determined angular information 266, along with the range information 262, corresponding to the detection.

The spatially-determined angular information 264 and/or the temporally-determined angular information 266, or a combination thereof (along with the range information 262) is provided to the mapping module 258. The mapping module uses the spatially-determined angular information 264 and/or the temporally-determined angular information 266 to generate positional information 268, such as a fusion map, that maps the detection relative to the vehicle 102. The positional information 268 is sent to the vehicle-based system 202 for use in performing parking assist or other driver-assistance or autonomous driving function.

Figure 3:
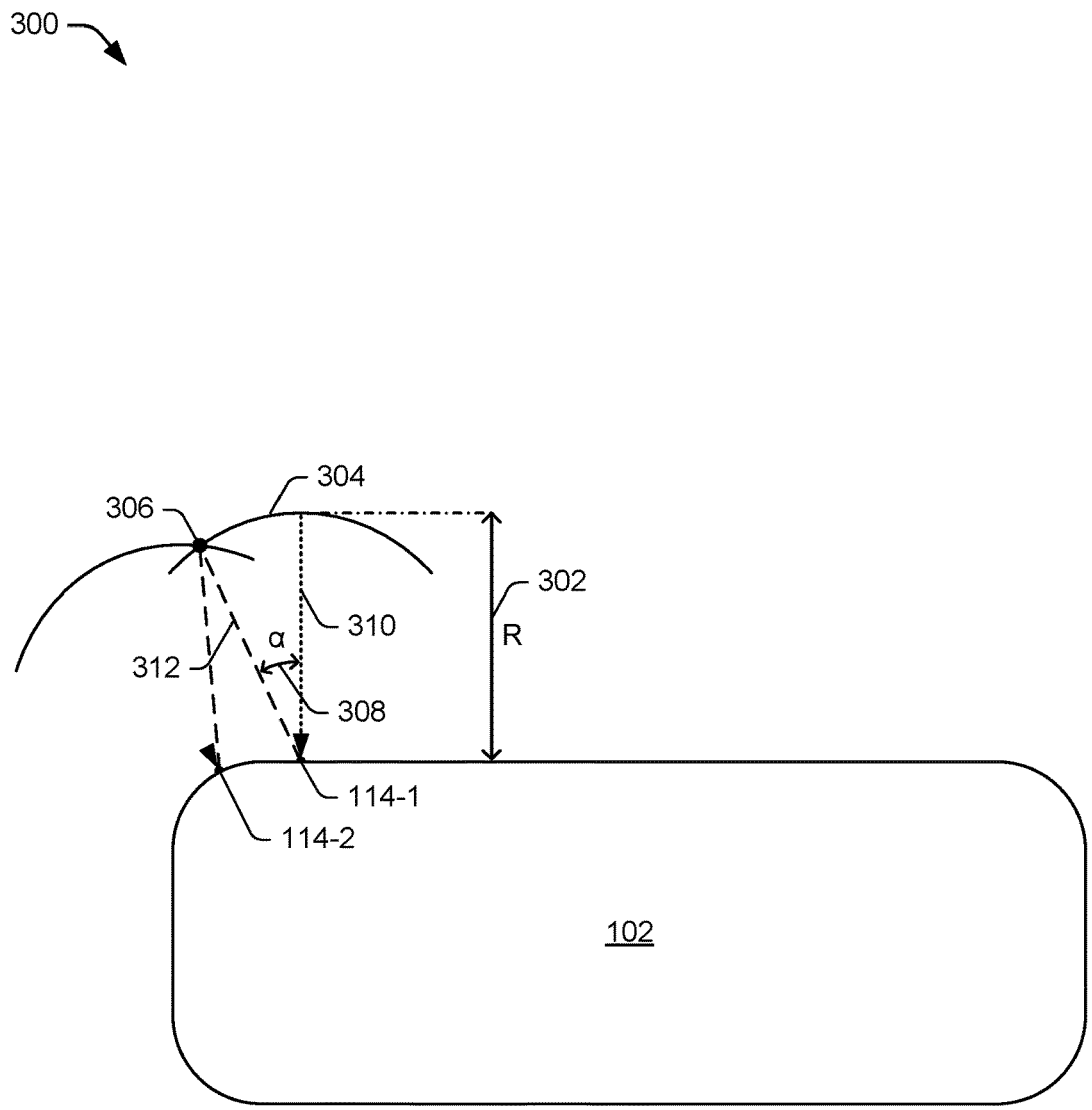
FIG. 3 illustrates an example implementation of spatial intersection detection.

FIG. 3 illustrates an example implementation 300 of spatial intersection detection. The vehicle 102 can be stationary or moving. The pair of sensors 114 includes the first sensor 114-1 and the second sensor 114-2. In an example, both of the sensors 114-1, 114-2 transmit an ultrasonic pulse. The pulses can be transmitted at different times or simultaneously, as further described below. Each of the sensors 114-1, 114-2 can detect a reflection of the respective ultrasonic pulse. Based on time-of-flight, a distance (e.g., range R 302) to the object that reflected the ultrasonic pulse is calculated by the sensor. Using this information, an arc 304 can be drawn in the FOV of the sensor at the range R 302 for each sensor 114-1, 114-2 to determine a point of intersection, referred to as a spatial intersection 306. This spatial intersection 306 represents a relative location of the detected object 120. Using the spatial intersection, the object-detection system 104 can determine angular information 308, which represents a horizontal angle between a direction that the sensor 114 is facing and a direction to the detected object 120 from the sensor 114. For example, the angular information 308 may represent an angle α between a facing direction 310 of the sensor 114-1 and a direction 312 of the spatial intersection 306 relative to the sensor 114-1. If, however, only one of the sensors, such as the first sensor 114-1 or the second sensor 114-2, detects the object 120 and the other sensor does not, then the spatial intersection will not exist and the object-detection system 104 may not be able to calculate the azimuth information.

In some aspects, one or more additional sensors (not shown) may be positioned vertically above or below the first and second sensors 114-1, 114-2. Such an arrangement may enable determination of an elevation angle associated with the surface of the object 120 (e.g., up to the height of the object) based on spatial intersections between arcs of ultrasonic signals of vertically-aligned sensors. This vertical implementation can be used not only for collision avoidance and parking assist, but also for determining clearance capability of the vehicle 102, such as whether the vehicle 102 can safely drive over the object 120 without risking a collision.

Spatial processing depends on performance of the neighboring sensors 114. In one example, the neighboring sensors 114 can transmit pulses at alternating times such that the second sensor 114-2 transmits its signal after the first sensor 114-1 has sufficient time to receive a detection. Alternatively, the second sensor 114-2 may transmit an ultrasonic pulse first and after receiving a detection, the first sensor 114-1 may transmit its ultrasonic pulse. By sending pulses at slightly different times, the sensors 114-1, 114-2 can avoid interference from one another. This technique may cause some latency if the product of the maximum detection range of the sensors 114 and the moving speed of vehicle 102 is greater than a threshold value. However, if the product of the maximum detection range of the sensors 114 and the moving speed of vehicle 102 is within the threshold value, the latency may be negligible. To address additional latency cause by vehicle movement, a temporal method may be used to process the spatial intersection between the pulses of the pair of sensors 114-1, 114-2.

In another example, the neighboring sensors 114 may send pulses at the same time without interference with one another by using individually-modulated waves. The ultrasonic waves can be individually modulated with one or more different and/or varying amplitudes and frequencies. In this way, each pulse may have a unique signature, which enables identification of a particular sensor that transmitted the pulse. Each sensor 114-1, 114-2 can identify its own signal and disregard potential interference from the other sensor's pulse.

Figure 4:
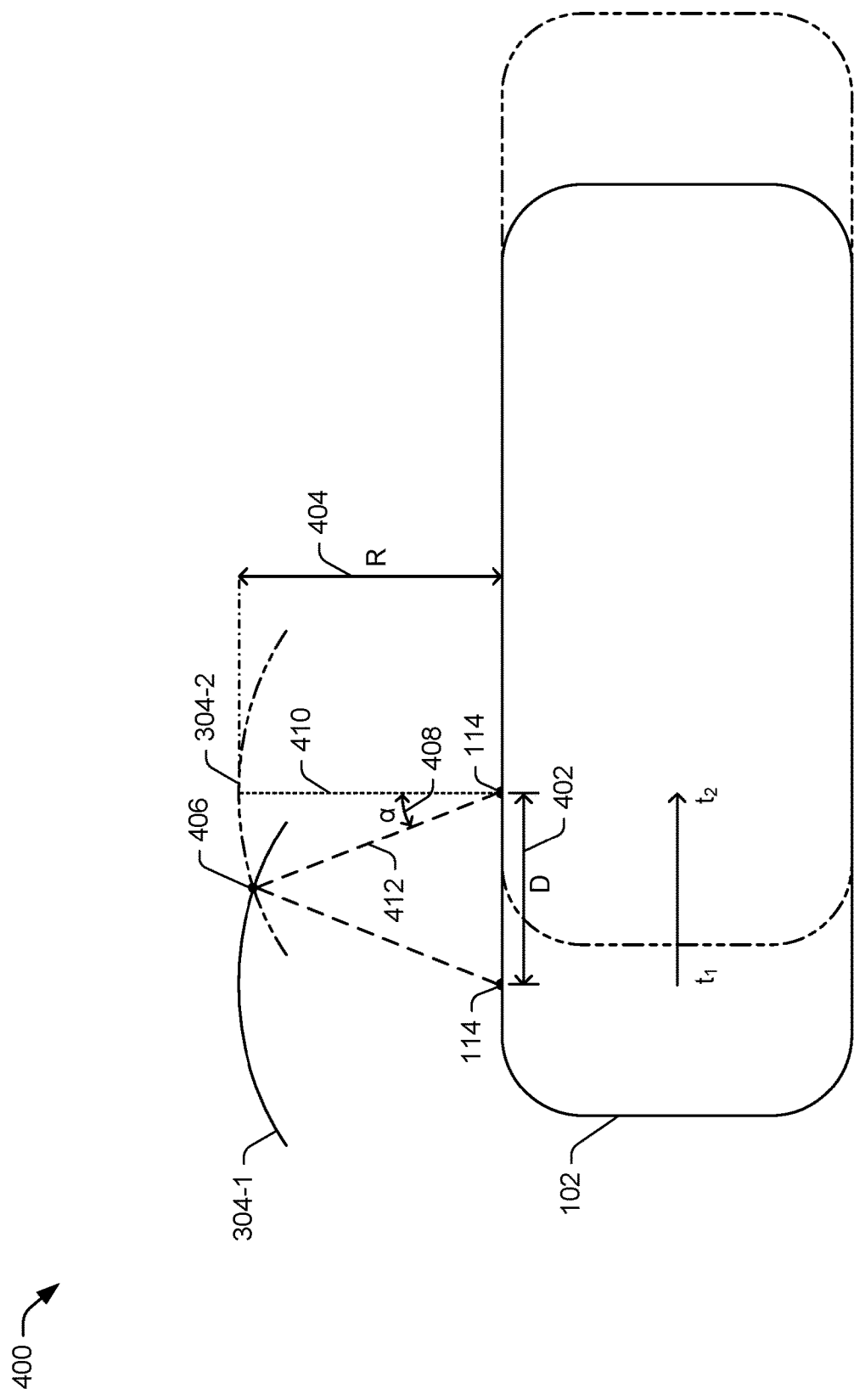
FIG. 4 illustrates an example implementation of temporal intersection detection.

FIG. 4 illustrates an example implementation 400 of temporal intersection detection. Here, the vehicle 102 is moving. The sensor 114 has a first detection based on a first ultrasonic pulse at time $t_1$ and then has a second detection based on a second ultrasonic pulse at time $t_2$. Based on localization information of the vehicle 102, such as speed and/or location, a distance D 402 is determined. In addition, range information (e.g., range R 404) is calculated for each detection. Based on an arc corresponding to the calculated range R 404 for each position of the sensor 114 at each detection (e.g., arc 304-1 at time $t_1$ and arc 304-2 at time $t_2$, a point of intersection can be determined. This intersection is referred to as a temporal intersection 406. The temporal intersection 406 represents a relative location of the detected object, which is detected by a single sensor during vehicle movement. Using the temporal intersection 406, the object-detection system 104 can determine azimuth information 408 of the object relative to the sensor 114. The azimuth information 408 represents the angle α between a facing direction 410 of the sensor 114 and a direction 412 of the temporal intersection relative to the sensor 114 (e.g., position of the sensor 114) at time $t_2$. If the vehicle speed is below a first threshold speed (e.g., the vehicle 102 is stopped or moving very slowly), the arcs 304-1, 304-2 may overlap too much, making it difficult to calculate the temporal intersection 406. If the vehicle speed is above a second threshold (e.g., the vehicle 102 is moving too fast), the arcs 304-1, 304-2 will be separated, resulting in no intersection between the arcs 304-1, 304-2.

A ratio of the distance D 402 over the range R 404 (e.g., distance-over-range (D/R) ratio) is determined using detections from a current position $P_0$ compared with a previous position $P_1$, e.g., $D_1 = P_0 - P_1$, where the current and previous positions $P_0$, $P_1$ are sequentially or serially generated. The "position" referred to herein can be any suitable reference on the vehicle 102 relative to the ground, such as a position of the sensor 114, a center of the rear axle of the vehicle 102, a center point of the vehicle 102, a center of a vehicle-coordinate system for the vehicle 102, a front or back center of the vehicle 102, a suitable point on the side of the vehicle 102 on which the sensor 114 is located, and so forth. Accordingly, the position is used to determine the distance D 402 that the sensor 114 has traveled between detections.

If $D_1/R$ is greater than a threshold value, then temporal processing is performed using $P_0$ and $P_1$. If $D_1/R$ is not greater than the threshold value, then the system may begin evaluating detections from other positions previous to the current position $P_0$. For example, consider previous positions $P_1$, $P_2$, $P_3$, and $P_4$, which are each serially previous to the one before it, such that $P_2$ is immediately previous to $P_1$, $P_3$ is immediately previous to $P_2$, and $P_4$ is immediately previous to $P_3$. The object-detection system 104 stores such datapoints in the memory 214. The object-detection system 104 calculates $D_2 = P_0 - P_2$ and determines if $D_2/R$ is greater than the threshold value. If so, then the temporal processing is performed using $P_0$ and $P_2$. If not, then the system calculates $D_3 = P_0 - P_3$ and determines if $D_3/R$ is greater than the threshold value. If so, then the temporal processing is performed using $P_0$ and $P_3$. If not, then the system calculates $D_4 = P_0 - P_4$ and determines if $D_4/R$ is greater than the threshold value. If so, then the temporal processing is performed using $P_0$ and $P_4$. If not, then the system may skip the temporal processing and rely solely on the spatial processing. By comparing only two arcs at a time, the processing of the data remains minimal and robust.

Table 1 below depicts a comparison of spatial processing and different sensitivity levels of temporal processing. Spatial processing provides a high level of detail and a low level of noise with medium continuity. However, as described above, spatial processing requires at least two neighboring sensors in order to produce spatial intersection points. The temporal processing, however, may be implemented with different D/R thresholds to adjust the sensitivity level of the detection.

TABLE 1

Temporal Processing and Spatial Processing

|  | Spatial | Temporal (Low $D/R_{threshold}$) | Temporal (High $D/R_{threshold}$) |
| --- | --- | --- | --- |
| Level of Detail | High | High | Medium |
| Level of Noise | Low | High | Medium |
| Continuity | Medium | High | Medium |

For example, a low D/R threshold for temporal processing provides a high level of detail with a high level of noise and high continuity. A high D/R threshold for temporal processing provides a medium level of detail with a medium level of noise and medium continuity. Any suitable value may be used for the D/R threshold, such as approximately 0.1 for the low D/R threshold or approximately 0.4 for the high D/R threshold. Further, any suitable number of thresholds may be used to define additional levels of sensitivity.

When detecting large and rigid objects (e.g., vehicles, curbs, and so forth), both of the neighboring sensors 114 are likely to detect the object, which provides the spatial intersections. Therefore, when both of the neighboring sensors 114 detect the object, the object-detection system 104 may default to using the high D/R threshold for the temporal processing in addition to the spatial processing. Both the spatial processing and the temporal processing are combined to increase the accuracy of the object detection and azimuth information determination.

When detecting smaller and softer objects (e.g., traffic cones, humans, small animals, etc.), the noise may be substantially zero but many details may be lost. In particular, if only one of the pair of neighboring sensors 114 detects the object (e.g., R>0 for the first sensor 114-1 in FIG. 3 but R=0 for the second sensor 114-2), then the spatial processing fails to produce spatial intersections for object detection and azimuth determination. Consequently, the object-detection system 104 may use the temporal processing without the spatial processing. Here, the D/R threshold may be lowered to increase detection of the details using the temporal processing. The tradeoff, therefore, is increasing both the continuity and the level of detail from medium to high, but also increasing the level of noise from medium to high. In aspects, the object-detection system 104 may default to using only the temporal processing with the low D/R threshold when only one sensor 114 of the pair of neighboring sensors has a detection.

In some cases, the temporal processing may fail, such as if the vehicle is moving too fast or too slow, or if localization information is unavailable (e.g., when the vehicle is in a tunnel or inside a parking structure and real-time kinematic (RTK) positioning and global navigation satellite systems (GNSS) information is unavailable). Here, the object-detection system 104 may use the sensor detections from the spatial intersections to perform scan matching, or other localization technique, to determine sensor-based localization information that is usable for the temporal processing. Any suitable combination of sensor detections of the pair of neighboring sensors 114 can be used for object detection. Some examples include fusing a current detection of the first sensor 114-1 to a previous detection of the second sensor 114-2, fusing a previous detection of the first sensor 114-1 with the previous detection of the second sensor 114-2, and so forth. Fusing two detections uses less computation and memory and is faster than an implementation that attempts to fuse a greater number of detections.

Figure 5:
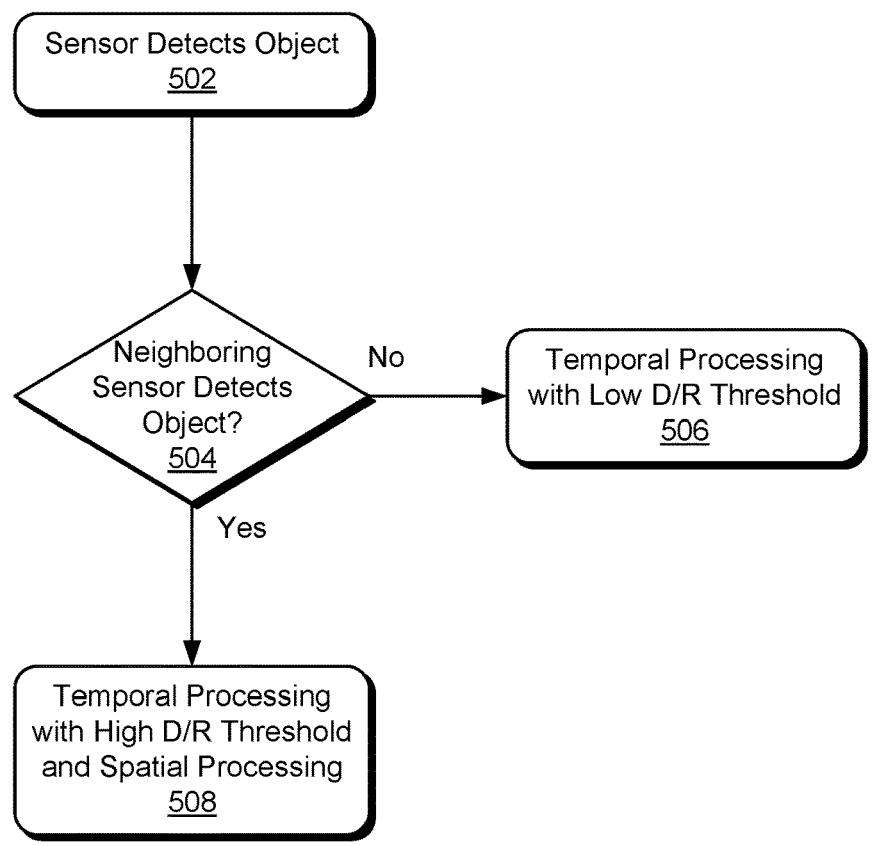
FIG. 5 depicts an example method for fusing temporal processing with spatial processing.

FIG. 5 depicts an example method 500 for fusing temporal processing with spatial processing. For example, the processor 212 executes instructions, stored in the memory 214 and associated with the fusion module 216, to configure the object-detection system 104 to perform the method 500. The method 500 includes a set of operations (or actions) performed but not necessarily in the order or combination described in FIG. 5. Further, any number of the operations may be skipped, repeated, combined, or reorganized in any order to implement a method or an alternate method. In portions of the following discussion, reference may be made to the environment 100 of FIG. 1 and to FIGS. 2 to 4.

At 502, a sensor detects an object. For example, the first sensor 114-1 detects the object 120, such as by using one or more ultrasonic pulses and detecting a reflection of the one or more ultrasonic pulses. The ultrasonic pulses provide range-only detection.

At 504, a determination is made as to whether a neighboring sensor has also a detection (e.g., range R>0). For example, the object-detection system 104 determines if the second sensor 114-2, which is adjacent to the first sensor 114-1 on the lateral side of the vehicle 102, has a detection.

If the neighboring sensor does not have a detection ("NO" at 504), then at 506, the object-detection system 104 implements temporal processing with a low D/R threshold on detections by the first sensor 114-1. This technique is based on an assumption that the detected object is a small/soft object and therefore an increased detection sensitivity is desired to detect a higher level of detail, with the trade-off of increased noise.

If the neighboring sensor does have a detection ("YES" at 504), then at 508, the object-detection system 104 implements both spatial processing and temporal processing, with a high D/R threshold for the temporal processing. In aspects, spatial-intersection data from the spatial intersections are overlaid on temporal-intersection data from the temporal intersections. This technique is based on an assumption that, if both the first sensor 114-1 and the second sensor 114-2 have detections, then the detected object is a large/rigid object. Consequently, a decreased level of sensitivity for the temporal processing, combined with the spatial processing, reduces the noise while providing sufficient details of the object for use with the vehicle-based systems 202.

In aspects, adjusting the D/R threshold can be viewed as applying a weight to temporal processing. For example, based on the D/R threshold selected, a higher or lower weight is applied to the temporal processing. A higher D/R threshold may represent a lower weight applied to temporal processing, which reduces the sensitivity and consequently, the noise. A lower D/R threshold represents a higher weight applied to temporal processing, which increases the sensitivity as well as the noise.

In some implementations, the spatial processing produces first angular information and the temporal processing produces second angular information. The first and second angular information can be used to generate a spatial-temporal fusion map that maps detections, by the ultrasonic sensors 114, relative to the vehicle 102. The spatial-temporal fusion map is usable by the vehicle-based systems 202 to steer the vehicle 102 during a dynamic parking maneuver or other assisted or automated driving technique.

Figure 6:
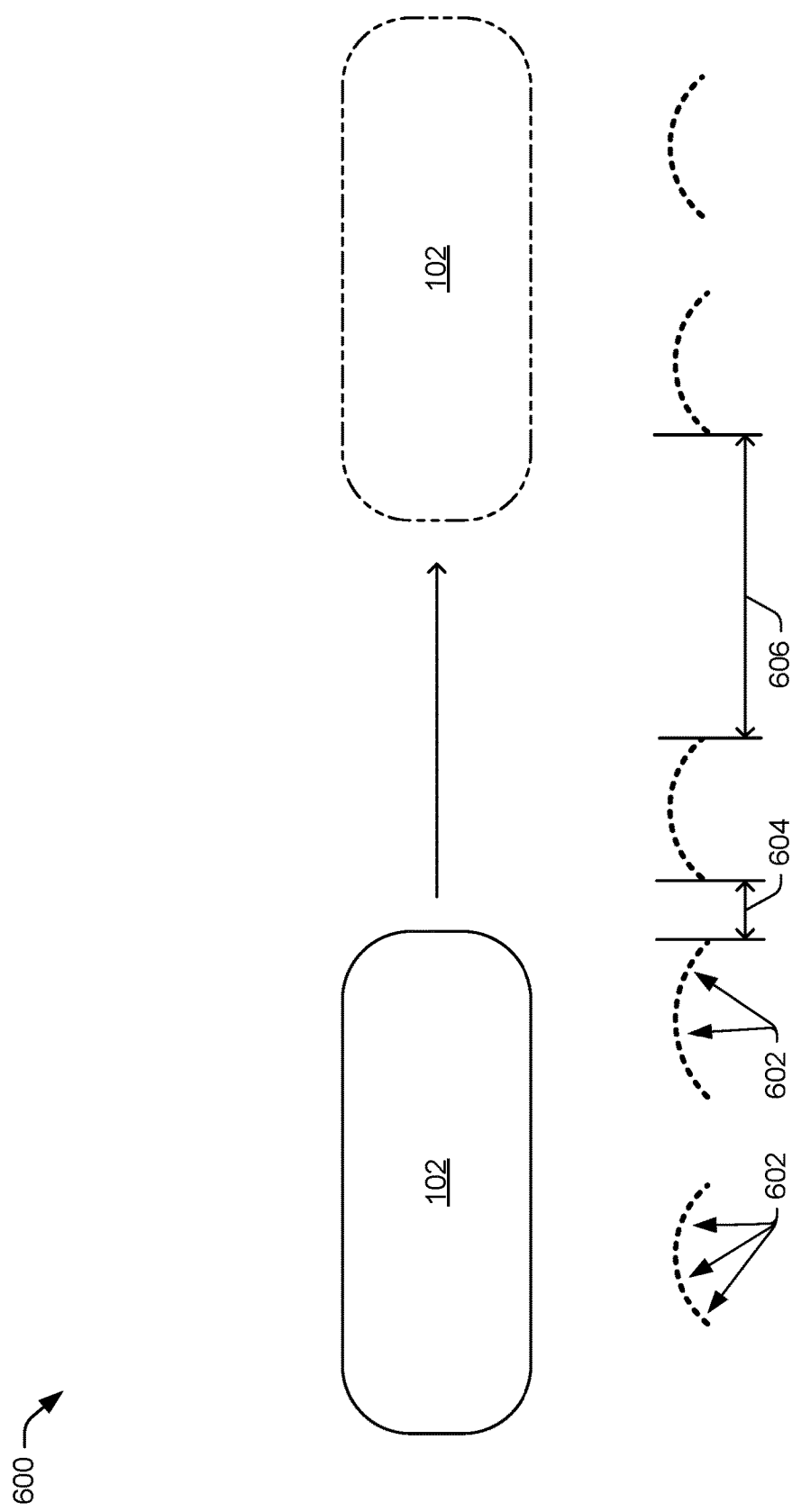
FIG. 6 illustrates an example implementation of open-spot detection for parking assistance.

FIG. 6 illustrates an example implementation 600 of open-spot detection for vehicle-parking-assist functions. While the vehicle 102 is passing laterally in front of a row of parked vehicles, the neighboring sensors 114 detect the fronts of the parked vehicles using a combination of spatial and temporal processing to detect both spatial and temporal intersections 602. Using the spatial and temporal intersections 602, along with corresponding angular information relative to the vehicle 102, the object-detection systems 104 can generate a spatial-temporal fusion map that maps the ultrasonic-sensor detections. The spatial and temporal intersections 602, and the spatial-temporal fusion map, can be used to detect an available parking space (also referred to as an "open spot"). For example, a space, such as space 604, between objects can be determined, using the spatial and temporal intersections 602. Here, the space 604 is measured and determined to be insufficient for the vehicle 102. As such, the vehicle 102 can continue moving down the row. As the vehicle 102 passes space 606, the object-detection system 104 determines that the space 606 has a width greater than a threshold width, which may be a width of the vehicle 102 plus sufficient space to open one or more doors of the vehicle to allow a person to exit or enter the vehicle 102.

Figure 7:
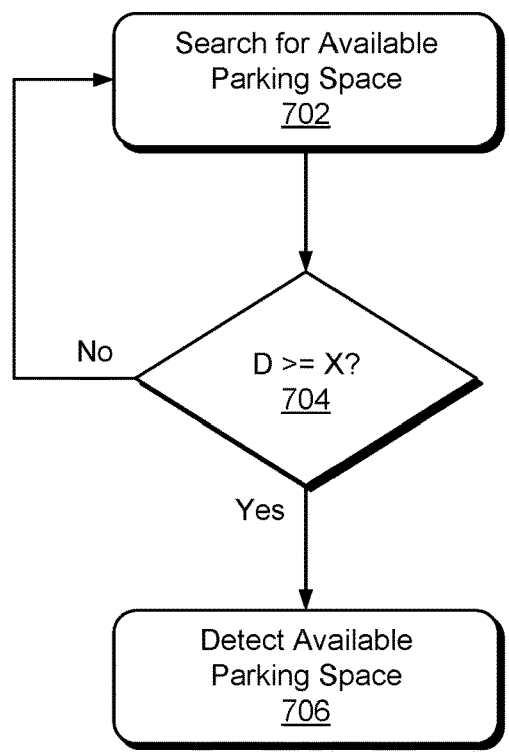
FIG. 7 depicts a method for open-spot detection for parking assistance.

FIG. 7 depicts a method 700 for open-spot detection for vehicle-parking-assist functions. For example, the processor 212 executes instructions, stored in the memory 214 and associated with the fusion module 216, to configure the object-detection system 104 to perform the method 700. The method 700 includes a set of operations (or actions) performed but not necessarily in the order or combination described in FIG. 7. Further, any number of the operations may be skipped, repeated, combined, or reorganized in any order to implement a method or an alternate method. In portions of the following discussion, reference may be made to the environment 100 of FIG. 1 and to FIGS. 2 to 6.

At 702, the object-detection system searches for an available parking space using spatial and temporal intersections of neighboring sensors that are laterally mounted on a vehicle. For example, the vehicle 102 moves down a row of parking spaces, some of which are occupied by vehicles or other objects. Using both spatial and temporal processing techniques described herein, the vehicle 102 detects at least a portion of the vehicles occupying many of the parking spaces (e.g., based on spatial and temporal intersections 602 from FIG. 6), which indicates to the object-detection system 104 that those parking spaces are occupied.

At 704, the object-detection system determines if a width D of a space between detected objects is greater than or equal to a threshold width X. For example, the object-detection system 104 determines whether the width of the space 604 or the space 606 is greater than or equal to the threshold width X. If the width D is less than the threshold width X ("NO" at 704), then the method 700 returns to 702 and the object-detection system 104 continues searching for an available parking space.

If the width D is determined to be greater than or equal to the threshold width X ("YES" at 704), then at 706, the object-detection system 104 determines that the space is available for parking (e.g., the space is an open parking spot). Then, the object-detection system 104 may begin a parking assist technique, as described with respect to FIG. 8.

Figure 8:
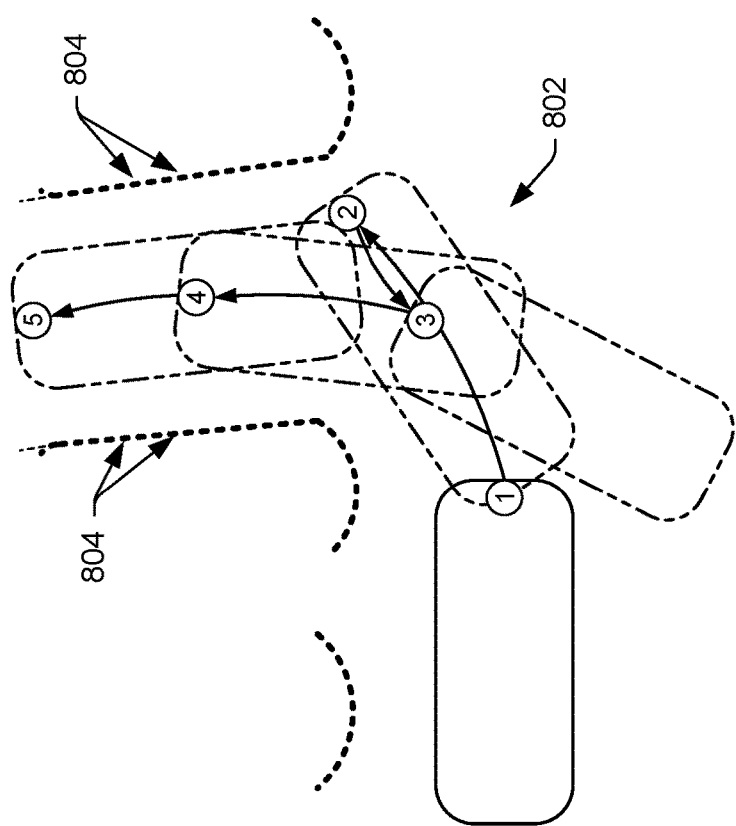
FIG. 8 illustrates an example implementation of a dynamic parking-assist maneuver performed using spatial and temporal processing of ultrasonic-sensor detections.

FIG. 8 illustrates an example implementation 800 of a dynamic parking-assist maneuver performed using spatial and temporal processing of ultrasonic-sensor detections. When an available parking space is detected, the vehicle-based systems 202 can maneuver the vehicle 102 into the available parking space, as illustrated at 802 with four example positions from 1 to 5. During this parking maneuver, the object-detection system 104 continues to detect nearby objects, such as by detecting ultrasonic intersection points 804 (e.g., spatial and temporal intersections). In aspects, the object-detection system 104 uses the ultrasonic intersection points 804 to generate a spatial-temporal fusion map of the sensor detections, which is usable by the vehicle-based systems 202 to steer the vehicle 102. In addition, the object-detection system 104 can determine size and shape measurements of the parking space based on ultrasonic intersection points 804 and determine distances and angular information (e.g., azimuth or elevation information) to the detected objects relative to the vehicle 102.

Figures 1, 9:
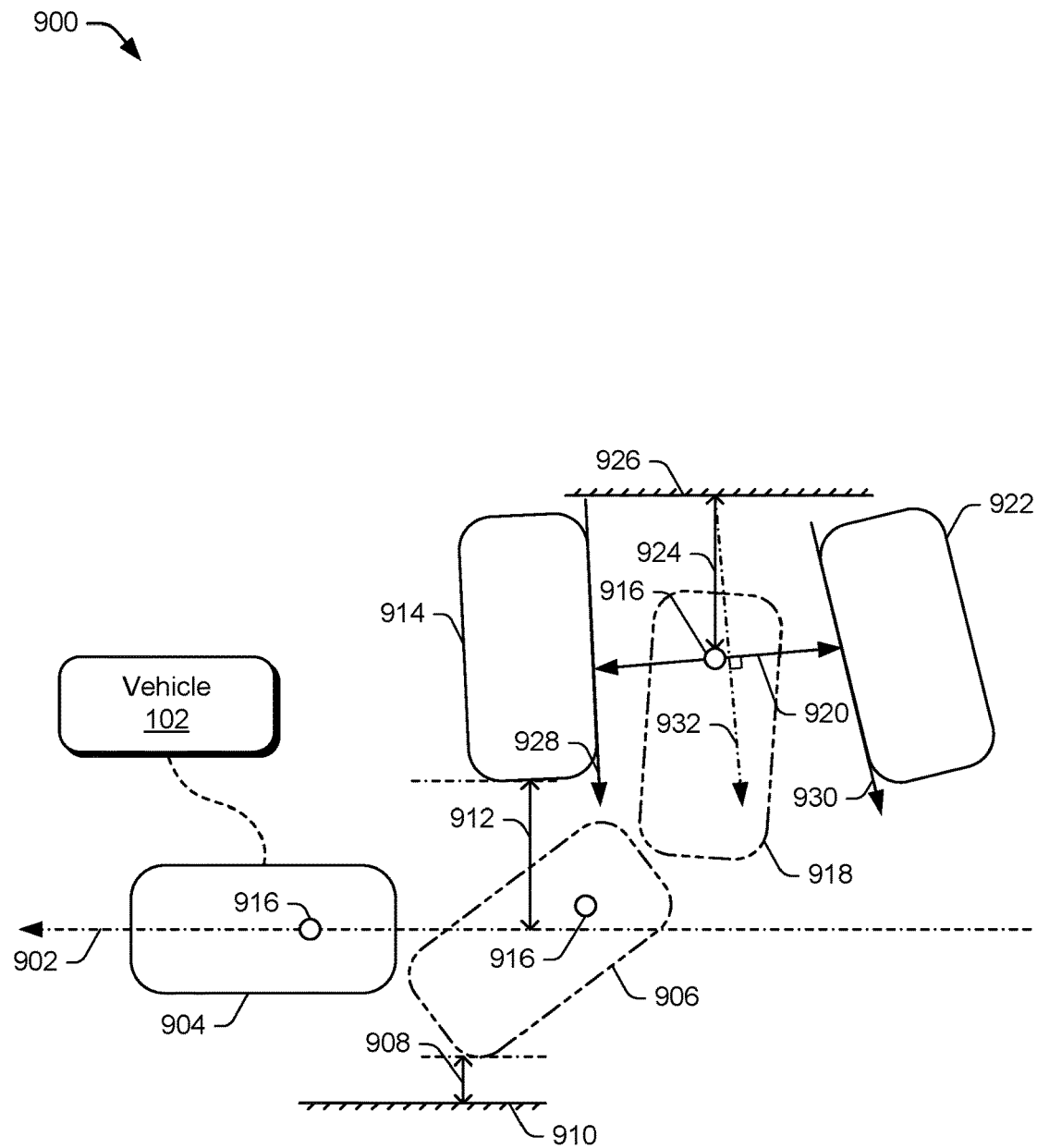
Figures 2, 9:
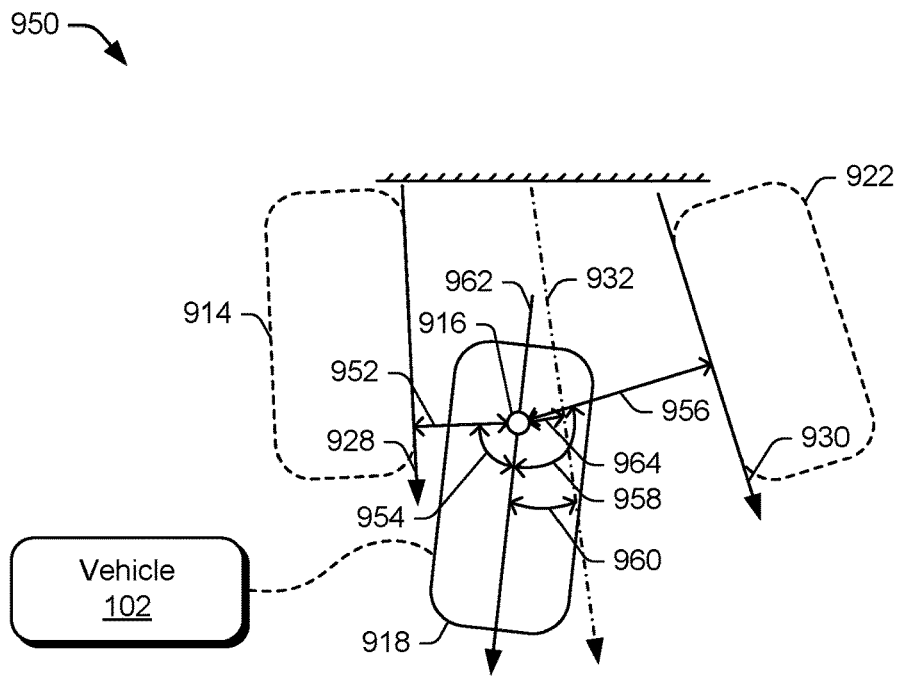
Figures 3, 9:
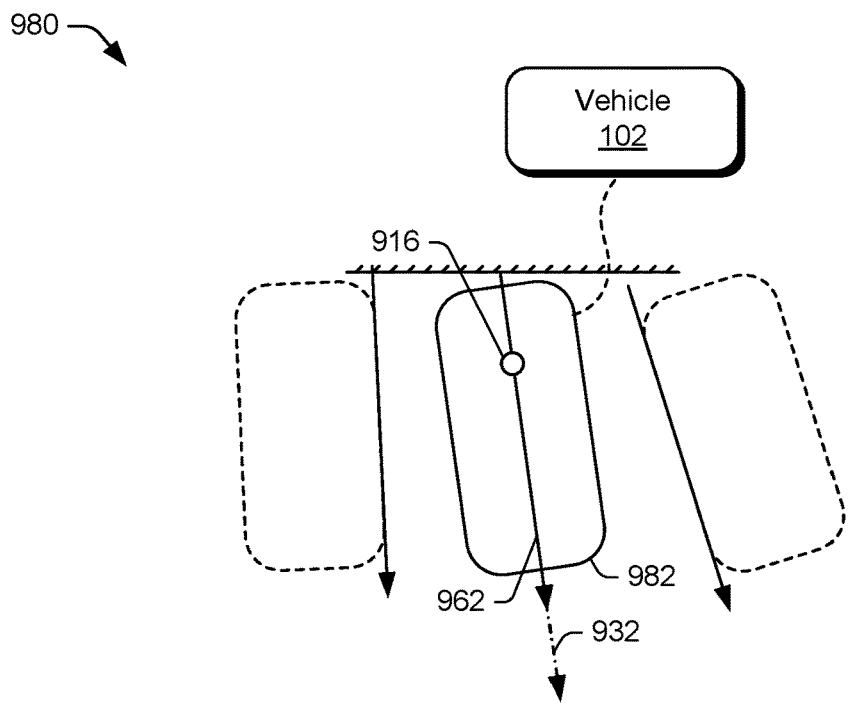

In more detail, consider FIG. 9-1, which illustrates an example implementation 900 of size measurements determined during a dynamic parking-assist maneuver based on information from spatial and temporal processing of ultrasonic-sensor detections. After detecting an available parking space, as described with respect to FIG. 7, the vehicle 102 may initiate the parking maneuver described with respect to FIG. 8. In this example, the front of the vehicle 102 is facing toward the left direction, based on a driving direction 902 during the open-spot detection method. Beginning at position 904, and moving toward position 906, the object-detection system 104 uses the ultrasonic-sensor detections to determine various distances and azimuth information of surrounding objects relative to the vehicle 102. For example, the object-detection system 104 measures a distance 908 from a surface of the vehicle 102 to the front of an object 910 (e.g., wall, curb, another vehicle, etc.). The object-detection system 104 can also measure a lateral distance 912 to a first parked vehicle 914. The lateral distance 912 can be measured from any suitable point corresponding to the vehicle 102, such as a surface of the vehicle 102, a center 916 of the vehicle 102, and so on. The center 916 of the vehicle 102 may represent any suitable reference on the vehicle 102, such as a position of the sensor 114, a center of the rear axle of the vehicle 102, a center of the front axle of the vehicle 102, a center point of the vehicle 102, a center of a vehicle-coordinate system for the vehicle 102, a front or back center of the vehicle 102, any point along a longitudinal axis of the vehicle 102 between the front and rear surfaces of the vehicle, and so forth.

Moving from position 906 to position 918, the object-detection system 104 can measure a width 920 of the parking space between the first parked vehicle 914 and a second parked vehicle 922. Additionally, the object-detection system 104 can measure a depth of the parking space or a distance 924 to a curb 926 or other object at the end of the parking space. Based on the ultrasonic-sensor detections, the object-detection system 104 can also determine a heading of the parked vehicles on either side of the vehicle 102, such as heading 928 of the first parked vehicle 914 and heading 930 of the second parked vehicle 922. Using the headings 928, 930 of the first and second parked vehicles 914, 922, the object-detection system 104 can determine a target heading 932 to orient the vehicle 102 in a final parking position.

Continuing this example in FIG. 9-2 is a view 950 of the vehicle 102 in position 918. The vehicle 102 monitors a distance 952 and azimuth information 954 to the first parked vehicle 914 and a distance 956 and azimuth information 958 to the second parked vehicle 922. In addition, the object-detection system 104 measures a heading offset 960 between the target heading 932 and a current heading 962 of the vehicle 102, based on the spatial and temporal intersections of the ultrasonic-sensor detections and localization information corresponding to the vehicle 102. The target heading 932 is also used to measure a center offset 964 between the target heading 932 and the center 916 of the vehicle 102.

Consider a continuation of this example in FIG. 9-3, which illustrates a view 980 of the vehicle 102 in a final position of the parking maneuver described with respect to FIGS. 9-1 and 9-2. By monitoring at least the measurements, distances, and offsets described above, the vehicle-based systems 202 can complete the parking maneuver by autonomously moving the vehicle 102 to a final position 982. Here, both the current heading 962 and the center 916 of the vehicle 102 are substantially aligned with the target heading 932.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

The following are additional examples of techniques for spatial and temporal processing of ultrasonic-sensor detections for mapping in vehicle-parking-assist functions.

Example 1: An object-detection system comprising: a device for executing instructions stored in a memory to implement a fusion module configured to: identify, using object-detection data from a pair of neighboring ultrasonic sensors on a vehicle, spatial intersections between arcs of ultrasonic signals of the pair of ultrasonic neighboring sensors; identify temporal intersections in the object-detection data between a current arc of a current ultrasonic signal and a previous arc of a previous ultrasonic signal of at least one sensor of the pair of neighboring ultrasonic sensors based on a movement speed of the vehicle; determine first range and angular information corresponding to an object relative to the vehicle based on the spatial intersections; determine second range and angular information corresponding to the object relative to the vehicle based on the temporal intersections; and generate a spatial-temporal fusion map that maps ultrasonic-sensor detections of the object relative to the vehicle based on the first range and angular information and the second range and angular information.

Example 2. The object-detection system of example 1, wherein the fusion module is further configured to apply a distance-over-range (D/R) threshold for the temporal intersections in the object-detection data.

Example 3. The object-detection system of example 2, wherein the D/R threshold comprises a value within a range of approximately 0.35 to approximately 0.45.

Example 4. The object-detection system of example 1, wherein the pair of neighboring ultrasonic sensors are positioned on a lateral side of the vehicle, each sensor of the pair of neighboring ultrasonic sensors configured to detect the object proximate to the lateral side of the vehicle and provide the object-detection data.

Example 5. object-detection system of example 1, wherein the object-detection data includes arc-based ultrasonic information corresponding to a relative distance of the object from each sensor of the pair of neighboring ultrasonic sensors.

Example 6. The object-detection system of example 1, wherein the pair of neighboring ultrasonic sensors are positioned proximate to a corner of the vehicle.

Example 7. The object-detection system of example 1, wherein the fusion module is further configured to adjust a detection-sensitivity for temporal processing by adjusting a distance-over-range (D/R) ratio used to process the temporal intersections in the object-detection data.

Example 8. The object-detection system of example 1, wherein the arcs of the ultrasonic signals of the pair of neighboring ultrasonic sensors are generated at different times.

Example 9. The object-detection system of example 1, wherein the ultrasonic signals of the pair of neighboring ultrasonic sensors are modulated differently for each sensor and generated at approximately a same time.

Example 10. The object-detection system of example 9, wherein: the pair of neighboring ultrasonic sensors includes a first sensor and a second sensor; and the ultrasonic signals for the first sensor are modulated with one or more frequencies and amplitudes that are different than the ultrasonic signals for the second sensor.

Example 11. A method for assisted parking of a vehicle, the method comprising: detecting spatial intersection points between arcs of ultrasonic signals of a pair of neighboring ultrasonic sensors that are lateral-side-mounted on a vehicle to detect one or more objects; detecting temporal intersection points between a current arc of a current ultrasonic signal and a previous arc of a previous ultrasonic signal of at least one sensor of the pair of neighboring ultrasonic sensors, the temporal intersection points based on a movement speed of the vehicle; determining first range and angular information of the one or more objects relative to the vehicle based on the spatial intersection points; determining second range and angular information of the one or more objects relative to the vehicle based on the temporal intersection points; and using a combination of the first and second range and angular information to detect an open parking space on a lateral side of the vehicle and perform a dynamic parking-assist maneuver of the vehicle into the open parking space.

Example 12. The method of example 11, further comprising: storing, in a memory, a plurality of datapoints corresponding to detections by the at least one sensor.

Example 13. The method of example 12, wherein the open parking space is detected by: identifying a space between two objects; measuring a width of the space; and determining that the width of the space between the two objects is greater than or equal to a threshold width.

Example 14. The method of example 13, further comprising: measuring a lateral distance to one or more objects on each lateral side of the vehicle based on the combination of the first and second range and angular information; and measuring a depth of the open parking space based on one or more front or rear mounted sensors on the vehicle.

Example 15. The method of example 14, further comprising: determining a heading of the vehicle based on localization information corresponding to the vehicle; determining a target heading for a final position of the dynamic parking-assist maneuver for the vehicle based on the width and the depth of the open parking space; and autonomously moving the vehicle into the final position by at least substantially aligning the heading of the vehicle with the target heading.

Example 16. A method for processing ultrasonic-sensor detections for mapping in vehicle-parking-assist functions, the method comprising: detecting, by a first sensor, an object within a detection range; determining whether a second sensor, which neighbors the first sensor, has detected the object; and adjusting a detection-sensitivity threshold for temporal processing based on whether the second sensor has detected the object.

Example 17. The method of example 16, further comprising, responsive to both the first sensor and the second sensor detecting the object, using both spatial-intersection data and temporal-intersection data to determine a range and azimuth of the object relative to one or both of the first sensor and the second sensor.

Example 18. The method of example 17, wherein: the detection-sensitivity threshold comprises a distance-over-range (D/R) ratio for the temporal-intersection data; and the adjusting the detection-sensitivity threshold comprises decreasing a detection sensitivity for the temporal processing by increasing the D/R ratio.

Example 19. The method of example 15, wherein the D/R ratio is adjusted to a value within a range of approximately 0.35 to approximately 0.45.

Example 20. The method of example 17, wherein the spatial-intersection data includes arc-based ultrasonic information corresponding to points of intersection between arcs of ultrasonic pulses, generated by each of the first sensor and the second sensor, that reflect off of a surface of the object.

Example 21. The method of example 17, wherein the temporal-intersection data includes arc-based ultrasonic information corresponding to points of intersection between arcs of ultrasonic pulses, sequentially generated by the first sensor, that reflect off of a surface of the object, the points of intersection based on a movement speed of a vehicle on which the first and second sensors are positioned.

Example 22. The method of example 16, responsive to the second sensor not detecting the object, using temporal-intersection data without spatial-intersection data to determine a range and azimuth of the object relative to a vehicle on which the first and second sensors are positioned.

Example 23. The method of example 22, wherein: the detection-sensitivity threshold comprises a distance-over-range (D/R) ratio for the temporal-intersection data; and the adjusting the detection-sensitivity threshold comprises increasing a detection sensitivity for the temporal processing by decreasing the D/R ratio.

CONCLUSION

Although aspects of a spatial and temporal processing of ultrasonic-sensor detections for mapping in vehicle-parking-assist functions have been described in language specific to features and/or methods, the subject of the appended claims is not necessarily limited to the specific features or methods described. Rather, the specific features and methods are disclosed as example implementations of the spatial and temporal processing of ultrasonic-sensor detections for mapping in vehicle-parking-assist functions, and other equivalent features and methods are intended to be within the scope of the appended claims. Further, various different aspects are described, and it is to be appreciated that each described aspect can be implemented independently or in connection with one or more other described aspects.

What is claimed:

1. An object-detection system comprising:
   a device for executing instructions stored in a memory to implement a fusion module configured to:
   identify, using object-detection data from a pair of neighboring ultrasonic sensors on a vehicle, spatial intersections between arcs of ultrasonic signals of the pair of neighboring ultrasonic sensors, a spatial intersection comprising an intersection between the arcs of ultrasonic signals that are generated at approximately a same time by the pair of neighboring ultrasonic sensors, the pair of neighboring ultrasonic sensors including a first sensor and a second sensor, the ultrasonic signals for the first sensor being modulated with one or more frequencies and amplitudes that are different than the ultrasonic signals for the second sensor;
   identify temporal intersections in the object-detection data between a current arc of a current ultrasonic signal and a previous arc of a previous ultrasonic signal of at least one sensor of the pair of neighboring ultrasonic sensors based on a movement speed of the vehicle;
   determine first range and angular information corresponding to an object relative to the vehicle based on the spatial intersections;
   determine second range and angular information corresponding to the object relative to the vehicle based on the temporal intersections; and
   generate a spatial-temporal fusion map that maps ultrasonic-sensor detections of the object relative to the vehicle based on the first range and angular information and the second range and angular information.

2. The object-detection system of claim 1, wherein the fusion module is further configured to apply a threshold value to a distance-over-range (D/R) ratio for the temporal intersections in the object-detection data.

3. The object-detection system of claim 2, wherein the threshold value comprises a value substantially within a range of 0.35 to 0.45.

4. The object-detection system of claim 1, wherein the pair of neighboring ultrasonic sensors are positioned on a lateral side of the vehicle, each sensor of the pair of neighboring ultrasonic sensors configured to detect the object proximate to the lateral side of the vehicle and provide the object-detection data.

5. The object-detection system of claim 1, wherein the object-detection data includes arc-based ultrasonic information corresponding to a relative distance of the object from each sensor of the pair of neighboring ultrasonic sensors.

6. The object-detection system of claim 1, wherein the pair of neighboring ultrasonic sensors are positioned proximate to a corner of the vehicle.

7. The object-detection system of claim 1, wherein the fusion module is further configured to adjust a detection sensitivity for temporal processing by adjusting a distance-over-range (D/R) ratio used to process the temporal intersections in the object-detection data.

8. A method for assisted parking of a vehicle, the method comprising:
   detecting spatial intersection points between arcs of ultrasonic signals of a pair of neighboring ultrasonic sensors that are lateral-side-mounted on a vehicle to detect one or more objects;
   detecting temporal intersection points between a current arc of a current ultrasonic signal and a previous arc of a previous ultrasonic signal of at least one sensor of the pair of neighboring ultrasonic sensors, the temporal intersection points based on a movement speed of the vehicle;
   determining first range and angular information of the one or more objects relative to the vehicle based on the spatial intersection points;
   determining second range and angular information of the one or more objects relative to the vehicle based on the temporal intersection points; and
   using a combination of the first and second range and angular information to detect an open parking space on a lateral side of the vehicle and perform a dynamic parking-assist maneuver of the vehicle into the open parking space, the open parking space detected by:
   identifying a space between two objects;
   measuring a width of the space; and
   determining that the width of the space between the two objects is greater than or equal to a threshold width.

9. The method of claim 8, further comprising:
   storing, in a memory, a plurality of datapoints corresponding to detections by the at least one sensor.

10. The method of claim 8, further comprising:
    measuring a lateral distance to one or more objects on each lateral side of the vehicle based on the combination of the first and second range and angular information; and
    measuring a depth of the open parking space based on one or more front or rear mounted sensors on the vehicle.

11. The method of claim 10, further comprising:
determining a heading of the vehicle based on localization information corresponding to the vehicle;
determining a target heading for a final position of the dynamic parking-assist maneuver for the vehicle based on the width and the depth of the open parking space; and
autonomously moving the vehicle into the final position by at least substantially aligning the heading of the vehicle with the target heading.

12. The method of claim 8, wherein:
the pair of neighboring ultrasonic sensors includes the at least one sensor and an additional sensor; and
the method further comprises:
determining whether the additional sensor has detected the one or more objects; and
adjusting a level of detection sensitivity for temporal processing of ultrasonic signals of the at least one sensor based on whether the additional sensor has detected the one or more objects.

13. The method of claim 12, wherein the determining of the first range and angular information and the determining of the second range and angular information are performed responsive to each of the at least one sensor and the additional sensor detecting the object.

14. The method of claim 12, wherein:
the level of detection sensitivity is based on a distance-over-range (D/R) ratio for the temporal intersection points; and
the adjusting of the level of detection sensitivity comprises decreasing the level of detection sensitivity for the temporal processing by increasing a value of the D/R ratio.

15. The method of claim 14, wherein the D/R ratio is adjusted to a value substantially within a range of 0.35 to 0.45.

16. The method of claim 12, wherein:
the level of detection sensitivity is based on a distance-over-range (D/R) ratio for the temporal intersection points; and
the adjusting of the level of detection sensitivity for temporal processing includes, responsive to the additional sensor not detecting the object, increasing the level of detection sensitivity by decreasing a value of the D/R ratio.

17. The method of claim 8, wherein arcs of the ultrasonic signals of the of the pair of neighboring ultrasonic sensors are generated at different times.

18. The method of claim 8, wherein arcs of the ultrasonic signals of the of the pair of neighboring ultrasonic sensors are modulated differently for each sensor and generated at substantially a same time.

19. The method of claim 18, wherein the ultrasonic signals for the at least one sensor are modulated with one or more frequencies and amplitudes that are different than the ultrasonic signals for the additional sensor.

20. The method of claim 8, wherein the pair of neighboring ultrasonic sensors are positioned on a lateral side of the vehicle, each sensor of the pair of neighboring ultrasonic sensors configured to detect the one or more objects proximate to the lateral side of the vehicle and provide object-detection data usable to determine one or more of the spatial intersection points and the temporal intersection points.

* * * * *